United States Patent [19]

Fox et al.

[11] Patent Number: 5,678,398
[45] Date of Patent: Oct. 21, 1997

[54] MOUNTING OF THE BATS OF A REEL ON A CROP HARVESTING HEADER

[75] Inventors: Thomas R. Fox, Winnipeg; Rheal Remillard, St. Joseph, both of Canada

[73] Assignee: MacDon Industries Ltd., Winnipeg, Canada

[21] Appl. No.: 590,507

[22] Filed: Jan. 24, 1996

[51] Int. Cl.[6] ................................................ A01D 57/02
[52] U.S. Cl. ............................. 56/226; 56/227; 56/364
[58] Field of Search ........................ 56/364, 220, 221, 56/226, 227, 362

[56] References Cited

U.S. PATENT DOCUMENTS

| | | | |
|---|---|---|---|
| 1,026,486 | 5/1912 | Benson | 56/227 |
| 2,652,678 | 9/1953 | Ramacher | 56/220 |
| 3,771,299 | 11/1973 | Gradwohl et al. | 56/220 |
| 3,902,305 | 9/1975 | Gibson et al. | 56/220 |
| 4,008,558 | 2/1977 | Mott | 56/226 |
| 5,024,050 | 6/1991 | Leidenix | 56/220 |

Primary Examiner—Terry Lee Melius
Assistant Examiner—Heather Shackelford
Attorney, Agent, or Firm—Adrian D. Battison; Murray E. Thrift

[57] ABSTRACT

A reel of a header comprises a tube which is mounted on arms at ends of the tube for rotation about a longitudinal axis of the tube. At axially spaced positions along the length of the tube is provided a plurality of support members each lying in a radial plane of the tube and forming a disc surrounding the tube. The disc carries a plurality of brackets extending radially outwardly from the edge of the disc and each bracket carries a respective one of a plurality of bats extending longitudinally of the tube and at angularly spaced positions around the tube. As the tube rotates the bats pass over a sickle knife of the header and sweep the crop onto a table of the header. The brackets are adjustable radially relative to the discs so that the brackets at the center of the tube are moved radially inwardly and the brackets at the ends of the tube are moved radially outwardly. This adjustment bends the bat relative to the tube in a slight curvature which is equal to the amount of deflection of the tube which occurs under its own weight due to sagging and due to acceleration of the tube over bumps. Thus the bat underneath the tube is substantially straight and can cooperate with a straight sickle knife. The bat which is above the tube is bent by a deflection which is substantially equal to double the deflection of the tube.

11 Claims, 2 Drawing Sheets

MOUNTING OF THE BATS OF A REEL ON A CROP HARVESTING HEADER

BACKGROUND OF THE INVENTION

This invention relates to a header for a crop harvesting machine and particularly to an arrangement of the reel of the header which includes a support tube and a plurality of angularly spaced bats carried by the support tube so that the bats can approach closely to the table or sickle knife as the bats rotate around the axis of the support tube.

Headers with reels of this type are well known and are widely used for crop harvesting. Some such headers have simple fixed bats in the form of flat plates which lie in axial planes of the support tube of the reel at angularly spaced positions around the axis so that the bats remain in those planes as the reel rotates. Other types of reels have a more complex bat construction which can include fingers which project outwardly from the edge of the bat and also provides a complex movement of each bat so that each bat pivots about an axis along its inside edge. This pivotal movement is controlled so that the fingers reciprocate as the reel rotates and move to angularly advanced and trailing positions relative to the axial plane containing the axis of the support tube and the pivot axis of the bat.

Generally the fixed bat type reel is used to move standing crop across the sickle knife onto or into the crop conveyors. Generally the pivotal type of bat with fingers is used to pick-up down crop and to move it across the sickle knife onto or into the crop conveyors.

The present invention can be used with either of the above types of reels and the definition of the invention set forth herein is intended to include both types of reels.

The reel is mounted on a pair of reel arms each at a respective end of the header. The reel comprises a support tube with a series of longitudinally spaced support members mounted on the tube and extending outwardly therefrom in respective radial planes for engaging the bats at spaced positions along their lengths. The structural strength of the reel is therefore provided by the support tube and by the stiffness of the individual bats which are spaced radially outwardly from the support tube.

Modern equipment is increasing in size so that the length of the header has dramatically increased in recent years. However the increased length in reels has reached a situation where there is now a considerable or discernible deflection of the longitudinal axis of the support tube from a straight line in a position adjacent the centre of the reel relative to the two ends of the reel simply due to the weight of the structure.

There remains however a requirement for maintaining the spacing of the bats from the table as the bats move over the table at a relatively small distance so as to provide a proper control of the crop as it moves across or onto the table.

SUMMARY OF THE INVENTION

It is one object of the present invention, therefore, to provide an improved reel of this general type which allows a closer control of the spacing between the bats and the table.

According to one aspect of the invention there is provided a header for a crop harvesting machine comprising: a header frame; a header table mounted on the header frame having header ends spaced transversely of a direction of forward movement of the header such that crop is transported over the table as the table is moved forwardly across the ground; and a reel mounted above the table for engaging the crop as it moves to the table, the reel comprising; a pair of reel arms each mounted adjacent a respective header end; an elongate support tube extending between the reel arms and having respective ends mounted on the arms by bearings allowing rotation of the support tube relative to the arms about a longitudinal axis of the support tube; a plurality of reel bats extending longitudinally of the support tube and arranged at angularly spaced positions around the support tube and spaced radially outwardly from the support tube such that rotation of the support tube causes each bat in turn to engage the crop; a plurality of support members at spaced positions along the length of the support tube and extending therefrom to the reel bats for supporting the reel bats at said spaced positions along the length of the bats; a first radial extent from the support tube of at least one of the support members positioned adjacent a center part of the support tube being less than a second radial extent from the support tube of the support members adjacent said ends of the support tube.

According to a second aspect of the invention there is provided a header for a crop harvesting machine comprising: a header frame; a header table mounted on the header frame having header ends spaced transversely of a direction of forward movement of the header such that crop is transported over the table as the table is moved forwardly across the ground; and a reel mounted above the table for engaging the crop as it moves to the table, the reel comprising; a pair of reel arms each mounted adjacent a respective header end; an elongate support tube extending between the reel arms and having respective ends mounted on the arms by bearings allowing rotation of the support tube relative to the arms about a longitudinal axis of the support tube; a plurality of reel bats extending longitudinally of the support tube and arranged at angularly spaced positions around the support tube and spaced radially outwardly from the support tube such that rotation of the support tube causes each bat in turn to engage the crop; a plurality of support members at spaced positions along the length of the support tube and extending therefrom to the reel bats for supporting the reel bats at said spaced positions along the length of the bats; wherein at least one of the support members is adjustable for varying the radial distance from the support tube of that portion of the bats carried by said at least one support member.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
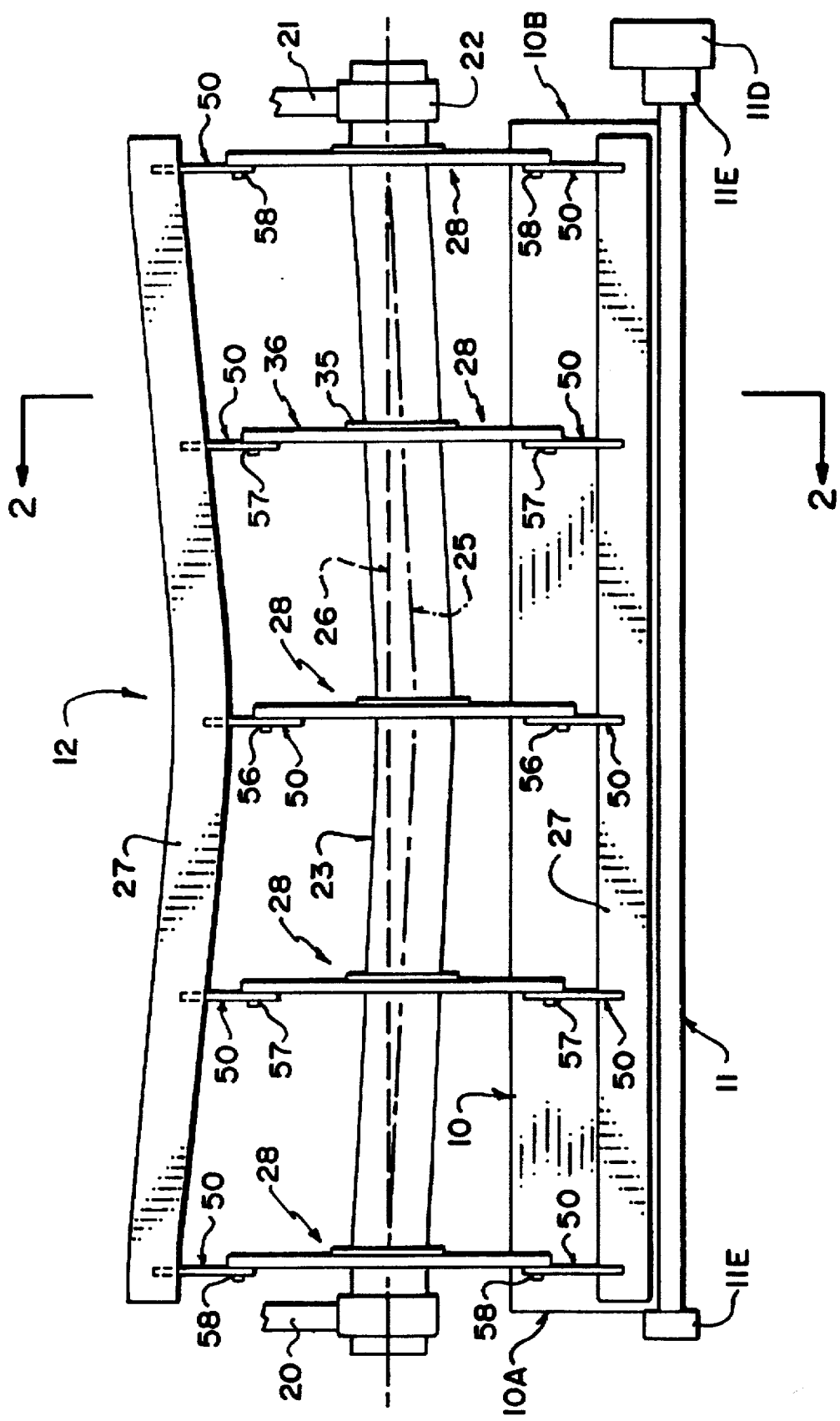
FIG. 1 is a front elevational view of a header according to the present invention showing an embodiment of reel having paddle-type fixed bats.
Figure 2:
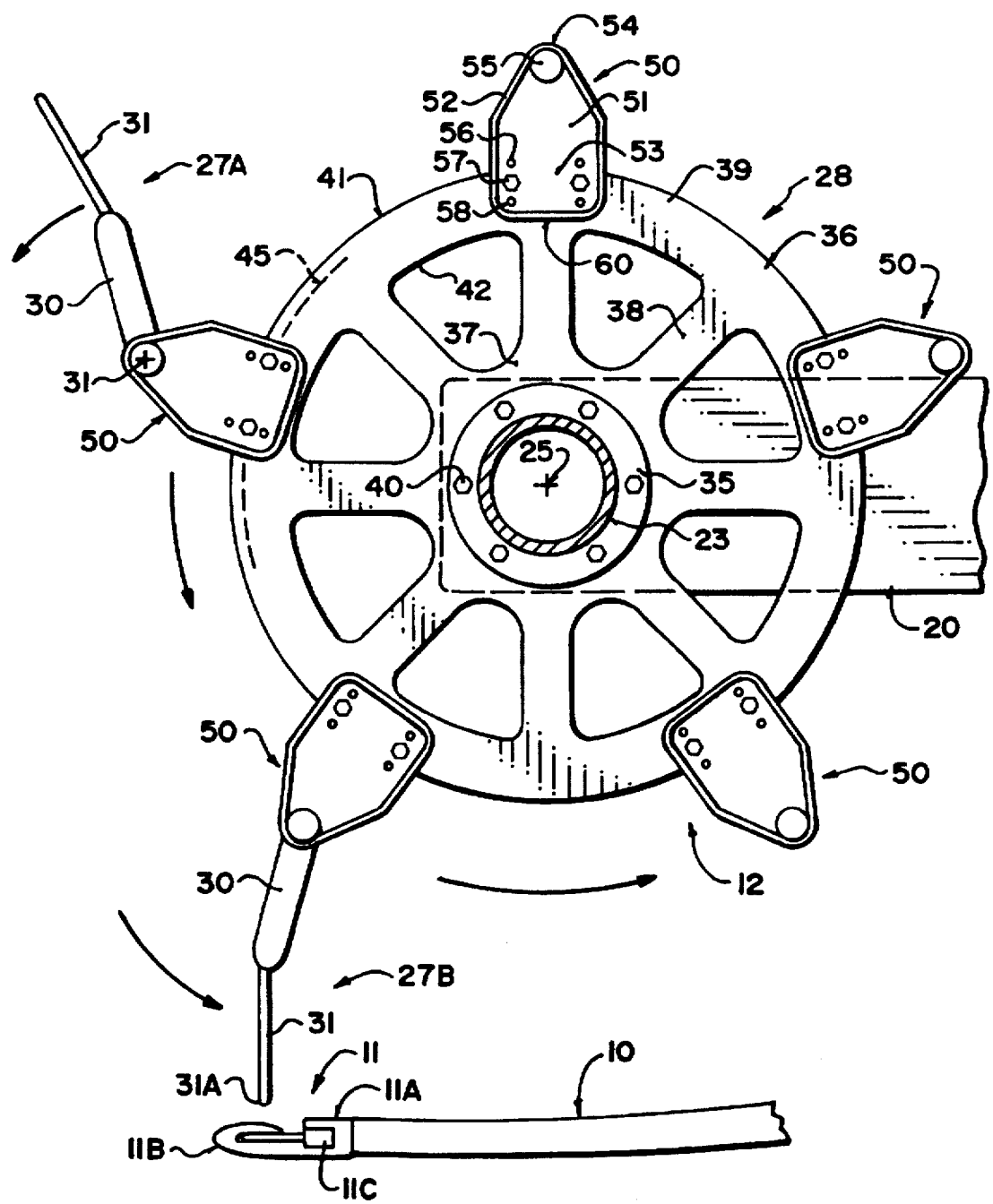
FIG. 2 is a cross sectional view taken generally along the lines 2—2 of FIG. 1, except that the bats shown are of the pivoting finger type.

The header of the present invention includes a number of parts which are omitted for convenience of illustration since these will be well known to one skilled in the art and will differ for different designs. Thus the main frame of the header is omitted and the only parts of the header which are illustrated are the table 10, the front sickle knife 11 and the reel 12. Again the table 10 and the sickle knife 11 are shown only schematically since these will again vary in design and the details are well known to one skilled in the art. The different type of bats shown in FIGS. 1 and 2 are well known to one skilled in the art.

Thus a table 10 defines a surface underlying the reel onto which the crop cut by the sickle knife 11 can fall. The reel is arranged above the table 10 so as to provide bats which sweep across the sickle knife 11 and control the movement the crop onto the table to the discharge section of the header which is not shown.

The table 10 has ends 10A and 10B which define the length of the header. It is well known that the length of the header can vary and has generally increased in recent years as attempts are made to form a header with increased working width for increased harvesting capacity.

The sickle knife includes a knife support bar 11A with a plurality of forwardly projecting support fingers 11B which guide a knife bar 11C in reciprocating movement across the width of the sickle knife driven by a drive 11D and carried in supports 11E. The knife bar carries a plurality of generally triangular cutting blades which define slots between them to provide a cutting action as the crop enters the slots between the knife blades.

The reel 12 comprises a pair of reel arms 20 and 21 which are mounted on the frame (not shown) and extend forwardly therefrom to a forward end positioned over the table 10. Each arm includes a bearing element 22 which provides support for an elongate support tube 23 for rotation about a longitudinal axis of the support tube with the bearings 22 supporting the tube at each end. The tube is driven in rotation about its longitudinal axis by a drive system (not shown) to provide rotation of the reel about the longitudinal axis at the forward part of the arms 20 and 21, As shown in FIG. 1, the tube 23 deflects under its own weight so that a line 25 along a center of the tube deflects from a straight line 26 joining the axes of the bearings 22. The amount of deflection is of course exaggerated in FIG. 1 for convenience of illustration. However in a header of the order of 30 feet, a deflection of the order of 2 inches can be expected between the ends and a centre point on the tube which is therefore of course spaced 15 feet from the ends.

The tube 23 carries a plurality of bats 27 which are spaced radially outwardly from the line 25 and are spaced angularly around the line 25. The bats extend along the length of the header. The bats are supported on individual support members 28 which are arranged at axially spaced positions along the length of the tube 23. In the example shown in FIG. 1 there are 5 such support members including two end support members arranged closely adjacent the arms 20 and 21 and 3 intermediate support members including a centre support member. However the number of such support members can of course vary depending upon the length of the header.

In FIG. 1, the bats 27 as shown are illustrated as simple planar fixed bats which are fixedly carried on the support members so as to be carried thereby at the constant angularly spaced positions around the axis 25 so that each bat in turn sweeps over the table 10 as the reel rotates.

In FIG. 2, the bats are shown of the finger type including a bat plate 30 and a plurality of fingers 31 which project outwardly from the bat plate. In addition each bat is mounted for pivotal movement about its respective bat axis 31 so that the bats move from an angularly retarded position shown at bat 27A to an angularly advanced position shown at bat 27B. The movement of the bats about the pivot axes 31 is effected by a drive mechanism (not shown) the details of which are available from prior U.S. Pat. No. 4,751,809 issued Jun. 21st 1988 and assigned to the present Assignee.

At each support member 28, a flange 35 is welded to the tube so as to lie in a radial plane of the tube in fixed position both angularly and axially of the tube.

The support member 28 comprises an annular disc 36 including a hub 37, a plurality of spokes 38 and an annular rim 39. The disc 36 is formed from pressed steel so as to have stiffness provided by a plurality of axially extending flanges (not shown). The hub 37 is bolted to the ring 35 by a plurality of bolts 40. The spokes 38 extend radially outwardly from the hub and support the rim 39. The rim 39 has a circular outer surface 41 and a circular inner surface 42 both of which have a centre located on the axis 25 of the tube 23. The rim 39 thus forms a flat annular surface lying in a radial plane of the axis 25. The rim 39 has a plurality of mounting holes at angularly spaced positions around the rim, the mounting holes being arranged in pairs with each pair being associated with a respective one of the bats. All of the mounting holes lie on an imaginary circle 45 which is again centered on the axis 25.

The support member 28 further includes a plurality of bat mounting brackets 50, each associated with a respective one of the bats 27. Each mounting bracket 50 comprises a flat plate 51 lying in a plane which is radial to the axis 25 with the flat plate lying in contact with the plate of the rim 39 so as to be bolted thereto. The flat plate 51 has upturned edges 52 formed by a press so as to provide structural strength to the plate to reduce the tendency of the plate to bend out of the radial plane.

The plate 51 has a wider bottom end 53 and from that wider bottom end tapers inwardly to an outer end 54 spaced outwardly from the rim 39. The outer rim 54 thus forms an apex of sufficient diameter to receive a bearing 55 mounted in the plate and defining the pivot axis 31 of the bat 27.

Each of the brackets 50 has three pairs of holes 56, 57 and 58 which are arranged at equidistantly spaced positions radially outwardly of the bracket. Thus the first pair of holes 58 are arranged at a bottom edge 60 of the bracket. The second pair of holes are arranged radially outwardly thereof with the pairs aligned in two rows. The third pair 56 is similarly spaced outwardly from the second pair 57 and again in the same rows. The spacing between the pairs of holes is equal to the spacing between the holes in the rim 39.

Each of the support members 28 along the length of the tube 23 are identical so that the disc 36 at each support member is the same as the disc 36 at each of the other support members. Similarly the brackets are all identical so that each disc carries the same brackets as each of the other discs.

However the radial distance of the pivot axis 31 of each bat can be adjusted relative to the axis 25 by selecting respective ones of the pairs of holes 56, 57 and 58.

As shown in FIG. 1, the bats 27 are at a maximum spacing from the axis 25 at the two end support members 28 and are at minimum spacing from the axis 25 at the centre support member 28. This adjustment of the radial position of the bats relative to the axis 25 is obtained by selecting the holes 56 for the central support member 28 and selecting the holes 58 for the outermost support members 28. The two support members intermediate the centre and ends have the brackets 50 positioned on the rim 39 by selecting the central holes 57.

This adjustment sets the bats relative to the tube 25 so that they are a minimum radial distance from the tube 25 at the center and moved to the maximum radial distance at the ends.

The use of the identical discs 36 and brackets 50 allows the parts to be manufactured identically and the curvature of the bats obtained by the above selection in assembly of the construction.

In addition this adjustment can be effected by the user if desired so that the bats can all be moved to the maximum or minimum position in which the bats are equidistantly spaced along the length of the tube if this is preferred for particular crop conditions.

When adjusted to the position shown in FIG. 1, it will be noted, as shown, that the difference in radial extent between the middle support member 28 and the end support members 28 is equal to the distance in deflection at the centre of the tube of the axis 25 relative to the straight line 26. Thus the bat which lies directly underneath the tube 23 at the instantaneous position of rotation is straight and the bat which is above the tube 23 at the instantaneous position of rotation has a curvature which is double that of the deflection of the axis 25 relative to the line 26.

This adjustment which provides a straightening of the bat 27 which is at the bottom of the tube allows the tips 31A of the fingers to be adjusted to pass as close as possible to the fingers 11B of the sickle knife without any danger of the fingers at the centre of the tube being deflected by further deflection of the tube into a position of engagement in the knife which of course will cause significant damage to the structure.

In practice the amount of deflection of the reel and particularly the tube 23 which is at a maximum when the header passes over a bump and hence accelerates the ends of the tube upwardly relative to the centre of the tube is arranged so that the maximum deflection is equal to the distance in radial extent of the bats from the tube.

In practice, therefore, when stationary, the bat at the bottom of the tube 23 will curve slightly upwardly at the centre position and will only achieve the straight line condition shown in FIG. 1 when the acceleration occurs which provides the maximum deflection.

However the adjustment as shown of the radial extent of the bats from the tube provides the ability of the structure to minimize a distance from the fingers to the knife so as to improve control of the crop during its movement over the knife and onto the table.

In an alternative arrangement (not shown) the brackets supporting the bats or the bats themselves are mounted directly on radially extending arms which are in turn mounted on and carried by a central support tube. This arrangement can be used with fixed bats which are bolted directly onto a front face of the bat support arm with the position of attachment being variable by selection of suitable mounting holes. In the pivoting bat arrangement, the bracket carrying the bat support bearing is carried on the front face of the bat support arm.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A header for a crop harvesting machine comprising:
a header frame;
a header table mounted on the header frame having header ends spaced transversely of a direction of forward movement of the header such that crop is transported over the table as the table is moved forwardly across the ground;
and a reel mounted above the table for engaging the crop as it moves to the table, the reel comprising;
a pair of reel arms each mounted adjacent a respective header end;
an elongate support tube extending between the reel arms and having respective ends mounted on the arms by bearings allowing rotation of the support tube relative to the arms about a line longitudinal of the support tube, the tube having a middle part located between the ends thereof and defining an imaginary line extending along a center thereof;
a plurality of reel bats extending longitudinally of the support tube and arranged at angularly spaced positions around the support tube and spaced radially outwardly from the support tube such that rotation of the support tube causes each bat in turn to engage the crop;
a plurality of support members at spaced positions along the length of the support tube and extending therefrom to the reel bats for supporting the reel bats at said spaced positions along the length of the bats;
at least one of the support members located in the middle part of the support tube having a first length from the center line of the tube to the respective reel bat which first length is less than a second length of each of the support members at said ends of the support tube from the center line of the tube to the respective reel bat.

2. The header according to claim 1 wherein the amount of difference between the first length and the second length is substantially equal to an amount of deflection from a straight line of the center line of the support tube.

3. The header according to claim 1 wherein each support member comprises a fixed bat support member with each of the bat support members being identical and a plurality of individual mounting members each connecting a respective one of the bats to the bat support member, each individual mounting member being adjustable relative to the respective bat support member.

4. The header according to claim 3 wherein each individual mounting member comprises a bracket to which the bat is attached.

5. The header according to claim 1 wherein each support member comprises:
an annular rim surrounding the tube and defining a circular mounting location surrounding the support tube at a constant radial distance from the center line of the support tube;
means connecting the annular rim to the support tube;
the annular rim of each of the support members having the same radial distance from the center line of the support tube;
each annular rim having a plurality of individual bracket members extending from the annular rim to a respective one of the reel bats;
a first distance from the annular rim to the reel bats of the brackets of said at least one of the support members located in the middle part of the support tube being less than a second distance from the annular rim to the reel bats of the brackets of said support members adjacent said ends of the support tube.

6. The header according to claim 5 wherein the bracket members are identical for each of the support members.

7. The header according to claim 6 wherein the bracket members each have at least two different mounting positions thereon for mounting the bracket member on the annular rim such that selection of one of the mounting positions relative to the other of the mounting positions defines the distance from the annular rim.

8. The header according to claim 5 wherein said means connecting the annular rim to the support tube comprises a plurality of spokes.

9. The header according to claim 7 wherein each bracket member includes a plate portion having a plurality of pairs of holes therein, each pair defining a respective one of said mounting positions and each pair being arranged for cooperation with a corresponding pair of holes in the annular rim.

10. The header according to claim 1 wherein each of the support members is adjustable for varying the length from the center line of the support tube to the reel bats of the support members.

11. The header according to claim 1 wherein each of the bats includes a plurality of fingers projecting therefrom so as to extend outwardly from the support tube for engaging the crop and wherein the header table includes a sickle knife for cutting the crop, the lengths being arranged such that the fingers are spaced from the sickle knife by a substantially constant distance along the length of the sickle knife when an amount of deflection from a straight line of the center line of the support tube is at a maximum.

* * * * *